United States Patent Office 2,776,899
Patented Jan. 8, 1957

2,776,899

CERAMIC PRODUCT AND BODY AND METHOD OF MAKING THE SAME

John W. Donahey, Drexel Hill, Pa., assignor to Foote Mineral Company, Philadelphia, Pa., a corporation of Pennsylvania No Drawing. Application January 9, 1953, Serial No. 330,592

11 Claims. (Cl. 106—45)

The present invention relates to a novel ceramic body and to a method of making the same; and, more particularly, the invention relates to a novel ceramic body available for use as a white ware ceramic body, which is capable of maturing relatively rapidly and at low temperatures and of being glazed with common vitreous enamels, such as those normally employed as porcelain enamels for steel, including titania-opacified enamels.

White ware ceramic bodies, such as household and hotel china, floor and wall tile, semi-vitreous white ware, vitreous china plumbing fixtures, electrical porcelain, and the like, are traditionally composed of clay, potter's flint (ground quartz) and feldspar. The clay is the plastic medium which permits forming the body through such processes as jiggering, casting, pressing, or the like. Feldspar is employed in conventional white ware bodies as a flux, since, at the temperatures required for firing, it melts at a lower temperature than do the clay and flint and in fusing promotes vitrification. The flint serves as an inert filling material.

With such ceramic bodies firing temperatures in the range of 2200–2400° F. are ordinarily required. This temperature may be lowered somewhat through the use of auxiliary fluxes or through the use of lower melting fluxes such as lepidolite or nepheline syenite. By careful formulation it has been possible to lower the firing temperatures but only to about 1900° F. In addition, the firing cycle for such bodies takes as long as 30–48 hours. One reason for this unduly long firing cycle is the care and control which must be exercised during the cooling stage of the cycle due to the fact that the quartz, at about 1100° F., undergoes crystalline inversion resulting in a rapid and marked contraction. During this step cracking of the body may occur unless slow and gradual reduction in the temperature is practiced. Furthermore, by virtue of the nature of the ingredients, the body must be soaked at the highest temperatures reached for from 2 to 4 hours. Because of the length of the firing cycle and the high temperatures required for firing such white ware bodies, high fuel costs are unavoidable and expensive equipment is required. Moreover, production is necessarily slow.

Another limitation of such white ware bodies is the fact that in glazing thereon special glaze formulations which mature at high temperatures and which possess relatively low coefficients of thermal expansion are required. On the other hand, a very considerable number of glazing compositions which mature at relatively low temperatures and which have high coefficients of thermal expansion have been developed for use as vitreous enamels for steel. These compositions show good abrasion resistance, excellent acid resistance, good color stability and generally high gloss. However, when it is attempted to apply them to conventional white ware ceramic bodies crazing results. The requirement for special high temperature-low expansion glazes further adds to production costs.

A further limitation of conventional white ware ceramic bodies is the fact that titania-opacified glazes cannot be applied thereon. Titania, as an opacifier in a glaze, produces a much higher reflectance at a lower concentration than do zircon, tin oxide and cerium oxide, the conventional ceramic glaze opacifiers. As is well known, because of the reactions that must occur between the glaze and the ceramic body to which it is applied, the maturing temperature of the glaze and of the body must be close. Thus, with conventional white ware bodies, the glaze must mature at temperatures ranging from 1900–2400° F. With titania-opacified glazes, however, the opacifying anatase crystals are developed by crystallization during firing at temperatures below about 1550° F. Above this temperature, long, rutile-type crystals develop which produce undesirable color and rough surface texture. At still higher temperatures, the titania dissolves resulting in loss of opacity.

As is also known, ceramic bodies of the conventional white ware type cannot be bonded, by fusion, to iron or steel. Iron and steel possess high thermal expansions, and the thermal expansion of conventional white ware bodies is at such variance from that of iron or steel that the stresses set up at the interface during heating and cooling preclude bonding of the body to the metal by fusion.

It is a principal object of the present invention to provide a ceramic body adapted for use as a white ware body but which matures at a relatively low temperature, much lower than that required by conventional white ware ceramic bodies.

Another object of the invention is to provide a ceramic body of the type described which not only matures at relatively low temperatures but also involves but a relatively short firing cycle, much shorter than that required by conventional white ware ceramic bodies.

Still another object of the invention is to provide a novel ceramic body to which can be applied conventional low temperature, high expansion glazes of the type available for use as porcelain enamels for steel.

A further object is to provide a ceramic body that can be glazed with a titania-opacified glaze.

A further object of the invention is to provide a method of making a ceramic body having the properties discussed above.

Other objects, including the provision of a ceramic body which can be bonded by heat to iron or steel, will become apparent from a consideration of the following specification and claims.

The novel ceramic body of the present invention comprises three basic components: (1) clay; (2) a glass possessing a measurable flow under its own weight at a temperature below about 1350° F. and having an average coefficient of linear thermal expansion which is greater than about $7.5 \times 10^{-6}$ inches per inch per ° C., and (3) a finely-divided inert inorganic material melting above about 1500° F. and having a linear thermal expansion which is substantially constant and which is at least about $10 \times 10^{-6}$ inches per inch per ° C.

The body is prepared by mixing the clay, inert material and glass in the form of a finely-divided frit, and water, to provide a moldable plastic mass, shaping the mass and firing the shaped body.

The stated ceramic body is capable of being fired at temperatures below about 1500° F., and the maximum temperatures reached in the kiln will generally range between about 1300 and about 1500° F. More important, however, is the fact that the firing cycle is very brief, the entire cycle, during which the shaped body is heated from room temperature to vitrification temperature and cooled back to room temperature being only about four hours. The body will also possess a substantially constant linear thermal expansion the coefficient of which may range from $9 \times 10^{-6}$ to about $13.5 \times 10^{-6}$ inches per inch per °C. Moreover, the defined body can be readily glazed with conventional glazes, such as those of the porcelain enamel type, which mature at about 1200–1400° F. and which possess a high linear thermal expansion, that is, a linear expansion the coefficient of which ranges from about $9 \times 10^{-6}$ to about $12 \times 10^{-6}$ inches per inch per °C. typical of the conventional porcelain enamel type glazes. Because of the low maturing temperatures of the body of the present invention it is also possible for the first time to provide a ceramic body glazed with a titania-opacified material. It has also been found that the defined ceramic body may be bonded by heating to iron or steel, either directly, or indirectly through the agency of an intermediate layer of vitreous enamel.

With respect to the clay employed in preparing the ceramic body in accordance with the present invention, it may be any of the clays normally employed in the manufacture of white ware. Such clays normally fall within the general classes of kaolins, such as china clay, and ball clays. Mixtures of clays may be employed, and in the preferred embodiment of the invention, the clay component is made up of a mixture of ball clay and a kaolin, particularly china clay. As is known in the art, the choice and proportions of the various types of clay employed may be varied according to the particular process of manufacture involved and according to the desired physical properties in the fired product. Thus, a high proportion of ball clay will provide higher plasticity in the moldable plastic body and a high degree of vitrification in the fired product. A high proportion of kaolin provides a moldable body which is less plastic and a fired product which is less vitreous but which possesses a lighter color. Ball clays ordinarily contain a considerable proportion of organic materials, and when a substantial proportion of such clay is employed, it is preferred to select a type which has a minimum content of organic material since too high a proportion of organic material may result in black coring of the body. Because lighter color in the product is a desirable characteristic, in the preferred products at least one-third of the clay component is china clay.

In accordance with the present invention, there is employed as the flux or principal vitrification agent, in place of the feldspar of conventional white ware bodies, a special type of glass in the form of a finely-divided frit. The glass, in addition to being substantially insoluble in water must melt at a relatively low temperature. A convenient test for determining whether any particular glass possesses the requisite fusion flow characteristic for use in accordance with the present invention is the Kinzie fusion flow method described in the Journal of the American Ceramic Society, vol. 15, No. 6, 1932, pp. 357–360. Glasses which have the proper fusion flow characteristics for use in accordance with the present invention are those which will soften and flow under their own weight at temperatures below about 1350° F., and preferably at temperatures between about 1000 and 1100° F.

As was stated previously, the glass must have a high coefficient of linear thermal expansion. Being a glass, its thermal expansion will also be substantially regular, that is to say, when its expansion below its softening point is plotted against temperature, the resulting curve will be substantially free from inflections or abrupt changes in slope. With respect to the coefficient of linear thermal expansion it must be at least about $7.5 \times 10^{-6}$ inches per inch per °C. and may range up to $17 \times 10^{-6}$ inches per inch per °C. Preferably, however, its coefficient of linear thermal expansion will be at least about $10 \times 10^{-6}$ inches per inch per °C. Examples of glasses which may be employed are silica-free, alkali alumina phosphate glasses and alkali boro silicate glasses and alkali titania silicate glasses having the above properties. The silic-free alkali alumina phosphate glasses are preferred for use in accordance with the present invention.

In this conection, a particularly advantageous silica-free alkali alumina phosphate glass is one comprising between about 5 and about 15 mol percent of $Li_2O$, between about 15 and about 33 mol percent of $Na_2O$, between about 15 and 23 mol percent of $Al_2O_3$, between about 20 and about 32 mol percent of $P_2O_5$ and fluorine in an amount equivalent to between about 2 and about 15 mol percent of $Na_2F_2$. $B_2O_3$ may also be included in amounts up to about 15 mol percent. In the glass the sum of the mols of any $B_2O_3$ and $Al_2O_3$ divided by the mols of $P_2O_5$ will provide a ratio between about 0.6 and about 1.6, and the sum of the mols of any $B_2O_3$ and of $Al_2O_3$ and of $P_2O_5$ divided by the sum of the mols of $Li_2O$ and of $Na_2O$ will provide a ratio between about 1 and about 1.5. A preferred glass within this general type is one comprising between about 8 and about 13 mol percent of $Li_2O$, between about 25 and about 30 mol percent of $Na_2O$, between about 18 and about 20 mol percent of $Al_2O_3$, between about 24 and about 28 mol percent of $P_2O_5$, between about 2 and about 12 mol percent of $B_2O_3$, and fluorine in an amount equivalent to between about 2 and about 15 mol percent of $Na_2F_2$, the sum of the mols of $B_2O_3$ and of $Al_2O_3$ divided by the mols of $P_2O_5$ providing a ratio between about .8 and about 1.2, and the sum of the mols of $B_2O_3$ and of $Al_2O_3$ and of $P_2O_5$ divided by the sum of the mols of $Li_2O$ and $Na_2O$ providing a ratio between about 1.2 and about 1.4.

In preparing the ceramic body in accordance with the present invention, the glass will be in the form of a frit. The preparation of such a frit will present no problem to those skilled in the art since in general it involves merely mixing together raw materials in proportions to provide the desired composition, melting the mixture, quenching the melt and grinding the solid glass product to the desired size. The frit will be finely-divided and in general will be such that less than about 5% thereof will be retained on a standard 100 mesh sieve. Preferably, the frit is milled so that no more than about 5% thereof will be retained on a standard 200 mesh sieve.

With respect to the inert material, it may be any inorganic compound, either synthetic or mineral, which does not melt and which is otherwise unaffected at temperatures below about 1500° F. In addition, the material must be insoluble in water and substantially inert to water. Thus, MgO is not satisfactory since it will hydrate in the presence of water. Examples of materials that are suitable for use are feldspar, calcined alumina, $TiO_2$ (such as rutile), talc, amorphous silica, nepheline syenite, and the like. Of these materials, feldspar is preferred because of the white coloration and other desirable characteristics, such as optimum porosity, it imparts to the resulting body. The inert material must have a high linear thermal expansion, that is to say, it will have a coefficient of thermal expansion of at least about $10 \times 10^{-6}$ inches per inch per °C., and its linear thermal expansion must be substantially constant, that is to say, when its thermal expansion is plotted against temperature, the resulting curve will be a substantially straight line. This is to be distinguished from potter's flint the termal expansion of which is not constant due to crystalline inversion discussed hereinabove.

The inert material employed in the preparation of the body will also be finely-divided, generally no more than about 5% thereof being retained on a standard 100 mesh sieve. Preferably, as in the case of the glass frit, the inert material will be milled such that no more than about 5% thereof will be retained on a standard 200 mesh sieve.

Small amounts of other additives may be employed in preparing the ceramic body in accordance with the present invention. For example, if it is desired to provide colors in the product, color oxides may be included in the mix, or even in the glass frit itself, in accordance with conventional practice. In this connection, the product can be made to simulate terra cotta in appearance by the inclusion of some red-burning clay. In addition, a small amount, generally not over about 2%, of bentonite may be included with the other ingredients to provide greater plasticity and green strength. A deflocculent, such as sodium silicate and/or sodium carbonate, may be employed in accordance with conventional practice.

The proportion of the various ingredients will be selected in accordance with known concepts in the art of making white ware. Thus, the clay must be present in an amount sufficient to provide the requisite plasticity for the particular forming technique followed. Since the glass frit is the primary binding agent in the fired body, it must be present in an amount to give the desired strength and porosity to the product. In general, therefore, the clay will make up between about 35 and about 60%, the glass frit between about 20 and about 40% and the inert material between about 20 and about 40%, by weight, of the mixture of these three ingredients. Preferably, the clay comprises between about 40 and about 50%, the frit between about 20 and about 35% and the inert material between about 25 and about 35%, by weight, of the mixture.

In preparing the ceramic body, the various ingredients are mixed together with sufficient water to provide a moldable mix of the requisite plasticity. Conventional ceramic mixing devices may be used for this purpose. The plastic mass is then shaped into the desired form following conventional practice depending upon the nature of the particular product desired. For example, in the preparation of porcelain electrical insulators and tiles the product may be shaped by dry pressing. In this case, the water content of the mass is low, generally between about 5 and about 15%, and a relatively high pressure on the order of several thousand pounds per square inch is required for forming. Articles may also be formed by extrusion of the mix in the form of a thick paste through a die. In the case of china ware, such as plates, and the like, soft plastic molding, such as the well known jiggering process, may be employed. In the case of more complex shapes, slip casting may be employed. In slip casting, as high as about 45–50% water may be required in certain instances.

The shaped articles are then dried, to remove free moisture, in a suitable oven, and then fired in a ceramic kiln or other suitable furnace. With the ceramic bodies of the present invention, firing equipment in which a rapid temperature rise may be achieved can be employed. The only limitations imposed upon the speed of firing are the water of hydration chemically combined with the clay and the amount of organic material that may be present in the body. Adequate time must be allowed for the clay to be dehydrated, otherwise rupturing may occur, and for organic material to burn out, otherwise black coring may result. Thus, aside from the foregoing considerations, which are well known to those skilled in the art, the dried shaped body may be heated as rapidly as desired to the firing temperature. The firing temperature will be below about 1500° F., and may be as low as about 1000° F. The body may be permitted to soak for a brief time, usually on the order of about a half hour, at the firing temperature following which the article may be cooled as rapidly as practical back to room temperature. The exact firing time and temperature will depend, of course, upon the particular glass selected and will also depend upon the particular characteristics desired in the product. Longer firing times and higher temperatures will provide greater strength and lower water absorption in the product. During firing the glass frit softens, bonding together the particles of inert material and anhydrous clay which remain as such as discrete particles bonded together by the glass.

One of the outstanding novel features of the body of the present invention is the fact that it may be glazed with conventional glazes which mature at a low temperature, such as glazes normally employed as porcelain enamels for steel. The glazing material, in the form of an aqueous suspension of vitreous enamel in frit form, may be applied, such as by dipping or spraying, to the shaped body before drying and/or firing or it may be applied to the fired product. In either event, the glazing coating will be dried and then fired at a temperature on the order of about 1200–1400° F. Because the ceramic body possesses a high linear thermal expansion, as do the conventional low temperature glazes, the expansion and contraction of the body during firing of the glaze will closely approximate that of the glaze itself. There will, therefore, be no crazing of the glaze. In glazing the ceramic product of the present invention, there are no critical limitations on the speed of firing the glazes, other than making the proper allowance for time for the glaze to smooth out on the body and for body-glaze reactions to be completed. It is possible to heat the glaze to maturing temperatures within a half hour. Where the body is fired and glazed simultaneously the considerations discussed above in connection with firing the body may govern.

As stated previously, it has been found that the ceramic body of the present invention may be bonded to iron or steel providing a means of joining ceramic bodies, as distinguished from a mere coating, such as enamel, to iron or steel articles. The body may be bonded directly to the iron or steel by placing the body in contact with the iron or steel and heating to the fushion temperature of the glass component of the body. The fused glass adheres to the hot metal and, upon cooling, a direct bond between the body and the iron or steel is provided. Because of the high linear thermal expansion properties of the body of the present invention, no stresses sufficient to disrupt the bond are set up at the interface between the body and metal. For optimum bonding, a layer of low melting high expansion vitreous enamel, such as a conventional porcelain enamel of the type suitable for use on iron or steel which have coefficients of linear expansion between about $10 \times 10^{-6}$ and about $12 \times 10^{-6}$ inches per inch per ° C., or even an enamel coating made from a slurry of the composition of the present invention, may be interposed between the ceramic body and iron or steel article, either by application to the iron or steel surface or to the ceramic body, or to both. In this case, the ceramic body is placed into contact with the iron or steel article, the layer of enamel being interposed between them and the assembly heated to cause fushion of the enamel layer and thus bonding between the ceramic body and the iron and steel. In this manner it is thus possible to fabricate such articles as steel-backed ceramic articles, such as tiles, ceramic reliefs and designs on iron or steel bases, and the like.

The present invention may be more readily understood from a consideration of the following specific examples which are given for the purpose of illustration only and are not intended to limit the scope of the invention in any way:

*Example I*

A mixture is made of 28½%, by weight, of ball clay, 14¼% of china clay, 27¼% of feldspar and 30% of a glass frit having the following composition:

|  | weight percent | mole percent |
|---|---|---|
| $Li_2O$ | 3.5 | 10.7 |
| $Na_2O$ | 16.0 | 23.6 |
| $Na_2F_2$ | 7.9 | 8.6 |
| $Al_2O_3$ | 21.2 | 19.1 |
| $B_2O_3$ | 7.2 | 9.5 |
| $P_2O_5$ | 44.2 | 28.5 |

The frit and the feldspar are milled so that only 2–5% residue remains on a standard 200 mesh sieve. The feldspar is of a type which contains approximately equal parts, by weight, of potassium oxide and sodium oxide.

The mixture is prepared as a casting slip by mixing about 40 parts, by weight, of water to about 100 parts, by weight, of the stated composition. Approximately .1% of sodium silicate is added as a deflocculent. After mixing for about a half hour, shaped articles are prepared by the normal slip casting process. The shaped articles are then dried at a temperature of about 230° F. Following drying, the articles are placed in a ceramic kiln where they are brought to a temperature of 1300° F. in about 1 hour and 45 minutes. They are permitted to soak at this temperature for about a half hour and are then cooled down to room temperature in about a half hour. The resulting bodies possess a water absorption of approximately 6%, by weight, and possess a fired modulus of about 3600 pounds per square inch. The product has a linear coefficient of thermal expansion of about $11 \times 10^{-6}$ inches per inch per ° C.

Similar bodies (having the same composition and prepared in the same manner except for firing cycle) when brought to 1400° F. in 2 hours and 10 minutes and soaked at that temperature for about a half hour, possess an absorption of approximatley 4.3% and a fired modulus of about 4600 pounds per square inch. The linear coefficient of thermal expansion is substantially the same as that of the product prepared above in this example.

*Example II*

A mixture is prepared from 30% ball clay, 15% china clay, 30% of air-floated rutile and 25% of a frit having a composition the same as that employed in Example I. The mixture is prepared as a casting slip, shaped and dried as in Example I. The shaped articles are fired by heating to a temperature of 1300° F. in two hours and are soaked at that temperature for about a half hour. After cooling to room temperature, the resulting fired body has a water absorption of about 8.8% and a fired modulus of about 2200 pounds per square inch. The product has a linear coefficient of thermal expansion of about $13.5 \times 10^{-6}$ inches per inch per ° C.

*Example III*

A shaped body is prepared as in Example II, in which, however, talc is used in place of rutile. The fired product has an absorption of about 11%, a fired modulus of about 3000 pounds per square inch and a linear coefficient of thermal expansion of about $12 \times 10^{-6}$ inches per inch per ° C.

*Example IV*

To the fired bodies of each of the foregoing examples, is applied a glaze consisting of a frit having the following molar composition:

| | |
|---|---|
| .60 $Na_2O$ | .15 $Al_2O_3$ |
| .15 $K_2O$ | .6 $B_2O_3$ |
| .15 $Li_2O$ | 2.5 $SiO_2$ |
| .10 SrO | |

The frit has the following composition in weight percent:

| | | | |
|---|---|---|---|
| $Na_2O$ | 13.6 | $Al_2O_3$ | 5.7 |
| $K_2O$ | 5.2 | $B_2O_3$ | 15.2 |
| $Li_2O$ | 1.6 | $SiO_2$ | 54.9 |
| SrO | 3.8 | | |

The stated frit is milled for approximately 16 hours with about 40%, by weight, of added water and 2%, by weight, of sodium silicate. The glaze is applied to the body by dipping following which the glaze is dried to remove surface water and is fired at approximately 1350° F. for two hours. Cooling to room temperature is accomplished in about a half hour.

*Example V*

A mixture is made of 28½%, by weight, of china clay, 14¼%, of ball clay, 26¼% of feldspar (the same type feldspar as used in Example I) and 31% of a glass frit having the composition set forth in Example I. The materials are such that 2.5%, or less, remains on a standard 200 mesh sieve.

100 parts of the mixture are blunged for ½ hour with 37.5 parts of water. The resulting slip is sprayed onto a surface of a sheet of steel to a thickness of about 1/32 of an inch. The resulting product was dried and fired to 1400° F. in 1½ hours and additionally soaked for ½ hour at this temperature. The product is then cooled to room temperature to provide a non-vitreous (unglazed) ceramic-steel composite body. By adding minor amounts of CoO and $MnO_2$ in making up the frit, the bond between the ceramic layer and the steel, which is sufficient for many purposes in the foregoing structure, may be further improved.

*Example VI*

A mixture prepared as in the first paragraph of Example V is shaped, with a small amount of water to render the mixture plastic and cohesive, into a biscuit about 3 inches by 3 inches by ½ inch thick. The shaped body is dried and fired as in Example I.

A slip is next prepared from 1.5 parts of china clay, .5 part of KCl, .125 part of $NaAlO_2$, 34 parts of water and 100 parts (all parts being by weight) of a glass frit having the following molar composition:

| | |
|---|---|
| .15 $Li_2O$ | .10 PbO |
| .50 $Na_2O$ | .15 $Al_2O_3$ |
| .15 $K_2O$ | .6 $B_2O_3$ |
| .10 SrO | 2.5 $SiO_2$ |

The frit also has the following composition in percent by weight:

| | | | |
|---|---|---|---|
| $Li_2O$ | 1.7 | PbO | 7.7 |
| $Na_2O$ | 10.7 | $Al_2O_3$ | 5.4 |
| $K_2O$ | 4.9 | $B_2O_3$ | 14.3 |
| SrO | 3.6 | $SiO_2$ | 51.7 |

All solids are such that 2-5%, or less, are retained on a standard 200 mesh screen, and the mixture is milled for four hours.

This slip is then sprayed on to a steel sheet and on to one broad surface of the fired ceramic body prepared in the first paragraph of this example. The two coated surfaces, while still wet, are brought together, and the assembly dried and fired as in Example V. In the resulting composite structure the ceramic body adheres tenaciously to the steel surface.

As an alternate method of carrying out this example, a conventional porcelain enamel is first applied to the steel sheet and fired. Then the fired body is held against the enameled surface and the assembly fired to bond the body to the enameled steel surface. In this case, the slip described in this example is not required.

Considerable modification is possible in the selection of the particular ingredients as well as in the proportions thereof, and in the particular procedures employed in preparing the ceramic body of the invention, without departing from the scope of the invention.

I claim:

1. A ceramic body adapted for use as a white ware ceramic product consisting essentially of between about 35 and about 60%, by weight, of clay selected from the group consisting of kaolin and ball clay, between about 20 and about 40%, by weight, of a glass selected from the group consisting of the silica-free alkali alumina phosphate glasses and alkali boro silicate glasses capable of flowing under their own weight at a temperature between about 1000 and about 1350° F. and possessing an average coefficient of linear thermal expansion of between about $7.5 \times 10^{-6}$ and about $17 \times 10^{-6}$ inches per inch per ° C., and between about 20 and about 40%, by weight, of a finely-divided inorganic material melting above about 1500° F. and unaffected by water and by temperatures below 1500° F. and having a linear thermal expansion which is substantially constant, the coefficient of which is at least about $10 \times 10^{-6}$ inches per inch per ° C., selected from the group consisting of feldspar, calcined alumina, titania, talc, amorphous silica and nepheline syenite.

2. The ceramic body of claim 1 wherein the glass consists essentially of a silica-free alkali alumina phosphate glass.

3. The ceramic body of claim 1 wherein the inorganic material consists essentially of feldspar.

4. The ceramic body of claim 3 wherein the glass consists essentially of a silica-free alkali alumina phosphate glass.

5. The method of making a ceramic body adapted for use as a white ware ceramic body which comprises mixing clay selected from the group consisting of kaolin and ball clay, a glass, in finely-divided frit form, selected from the group consisting of the silica-free, alkali alumina phosphate glasses and alkali boro silicate glasses capable of flowing under their own weight at a temperature between about 1000 and about 1350° F. and possessing an average coefficient of linear thermal expansion between about $7.5 \times 10^{-6}$ and about $17 \times 10^{-6}$ inches per inch per ° C., and a finely-divided inorganic material melting above about 1500° F. and unaffected by water and by temperatures below 1500° F. and having a linear thermal expansion which is substantially constant, the coefficient of which is at least about $10 \times 10^{-6}$ inches per inch per ° C., selected from the group consisting of feldspar, calcined alumina, titania, talc, amorphous silica and nepheline syenite in the proportion of between about 35 and about 60%, by weight, between about 20 and about 40%, by weight, and between about 20% and 40%, by weight, respectively, and water; shaping the resulting mass, and firing the shaped mass at a temperature below about 1500° F.

6. The method of claim 5 wherein the glass consists essentially of a silica-free alkali alumina phosphate glass.

7. The process of claim 5 wherein the inorganic material consists essentially of feldspar.

8. The method of claim 7 wherein the glass consists essentially of a silica-free alkali alumina phosphate glass.

9. A material for firing into a ceramic body adapted for use as a white ware ceramic body consisting essentially of a mixture of clay selected from the group consisting of kaolin and ball clay, in an amount between about 35 and about 60%, by weight, a glass selected from the group consisting of the silica-free, alkali alumina phosphate glasses and alkali boro silicate glasses capable of flowing under their own weight at a temperature between about 1000 and about 1350° F. and possessing an average coefficient of linear thermal expansion between about $7.5 \times 10^{-6}$ and $17 \times 10^{-6}$ inches per inch per ° C., in an amount between about 20 and about 40%, by weight, and a finely-divided inorganic material melting above about 1500° F. and unaffected by water and by temperatures below 1500° F. and having a linear thermal expansion which is substantially constant, the coefficient of which is at least about $10 \times 10^{-6}$ inches per inch per ° C., selected from the group consisting of feldspar, calcined alumina, titania, talc, amorphous silica and nepheline syenite in an amount between about 20 and about 40%, by weight.

10. The product of claim 9 wherein the glass consists essentially of a silica-free alkali alumina phosphate glass.

11. The product of claim 9 wherein the inorganic material consists essentially of feldspar.

References Cited in the file of this patent

UNITED STATES PATENTS

| | | |
|---|---|---|
| 2,000,285 | Hoffmann | May 7, 1935 |
| 2,233,575 | Bair | Mar. 4, 1941 |

FOREIGN PATENTS

| | | |
|---|---|---|
| 230,445 | Great Britain | 1925 |

OTHER REFERENCES

American Ceramic Society: Transaction VII, pages 217–220 (1900).